United States Patent
Teshima et al.

(10) Patent No.: US 8,360,436 B2
(45) Date of Patent: Jan. 29, 2013

(54) MECHANICAL SEAL SLIDING MEMBER, AND MECHANICAL SEAL

(75) Inventors: Yoshihiro Teshima, Tokyo (JP); Hiroshi Sawada, Kusatsu (JP)

(73) Assignees: Eagle Industry Co., Ltd., Tokyo (JP); Canon Machinery Inc., Kusatsu-Shi Shiga (JP)

( * ) Notice: Subject to any disclaimer, the term of this patent is extended or adjusted under 35 U.S.C. 154(b) by 123 days.

(21) Appl. No.: 12/812,033

(22) PCT Filed: Jan. 6, 2009

(86) PCT No.: PCT/JP2009/050038
§ 371 (c)(1),
(2), (4) Date: Jul. 8, 2010

(87) PCT Pub. No.: WO2009/087995

PCT Pub. Date: Jul. 16, 2009

(65) Prior Publication Data

US 2011/0101616 A1   May 5, 2011

(30) Foreign Application Priority Data

Jan. 11, 2008 (JP) ................................. 2008-004484

(51) Int. Cl.
*F16J 15/34* (2006.01)
(52) U.S. Cl. .................... 277/400; 277/399; 277/405
(58) Field of Classification Search ............... 277/358, 277/399, 400, 405
See application file for complete search history.

(56) References Cited

U.S. PATENT DOCUMENTS

| 3,744,805 A | * | 7/1973 | Heinrich | 277/400 |
| 5,501,470 A | * | 3/1996 | Fuse et al. | 277/400 |
| 5,529,318 A | * | 6/1996 | Fuse et al. | 277/400 |

(Continued)

FOREIGN PATENT DOCUMENTS

| EP | 0601821 A1 | 6/1994 |
| EP | 1350996 A2 | 10/2003 |

(Continued)

OTHER PUBLICATIONS

EPO Search Report dated May 17, 2011.

(Continued)

*Primary Examiner* — Gilbert Lee
(74) *Attorney, Agent, or Firm* — Harness, Dickey & Pierce, PLC (57) ABSTRACT

The present invention provides a mechanical seal sliding member with high lubricating characteristics, in which the coefficient of friction and the temperature of sliding surfaces are lowered and stabilized without excessive leakage. In the mechanical seal sliding member of the present invention, on the sliding surface 2, a plurality of grating sections 5 are formed separately in each of which a plurality of linear shape ridge portions parallel to each other are formed in a predetermined region with a predetermined pitch. The linear shape ridge portions of the plurality of grating sections are formed as inclined at a predetermined angle to a sliding direction of the sliding surfaces 2. Such periodic structure can improve the lubricating characteristics for lubrication. By irradiating a linearly polarized femtosecond laser with irradiating energy adjacent to a process threshold level to a material surface, a fine periodic structure with a cycle interval comparable with a laser wavelength and with a ridge depth half or less than the laser wavelength can be formed by a self-structuring manner.

10 Claims, 8 Drawing Sheets

U.S. PATENT DOCUMENTS

| | | |
|---|---|---|
| 6,189,896 B1 * | 2/2001 | Dickey et al. ............... 277/608 |
| 6,213,473 B1 | 4/2001 | Lebeck |
| 7,044,470 B2 * | 5/2006 | Zheng ............................ 277/400 |
| 2002/0014743 A1 | 2/2002 | Zheng |

FOREIGN PATENT DOCUMENTS

| | | |
|---|---|---|
| JP | 2000-088112 A | 3/2000 |
| JP | 2004-360012 A | 12/2004 |
| JP | 2007-263374 A | 10/2007 |
| WO | 02/04844 A2 | 1/2002 |

OTHER PUBLICATIONS

International Search Report dated Apr. 21, 2009.

* cited by examiner

MECHANICAL SEAL SLIDING MEMBER, AND MECHANICAL SEAL

FIELD

The present invention relates to a sliding member of a mechanical seal for a rotating shaft in a pump and the like, in particular, to a sliding member of a mechanical seal which is available to improve lubricating characteristics such as lowering and stabilizing the coefficient of friction and the temperature of a sliding surface. Also, the present invention relates to a mechanical seal using the same.

BACKGROUND

As materials used for sliding members (rings) of mechanical seals include a variety of combinations of silicon carbide sintered bodies, carbon bodies, cemented carbide bodies, alumina sintered bodies and the like.

When sliding members made of combinations of silicon carbide bodies and another silicon carbide bodies enable use at higher PV limiting value, a high PV limit enables an increased performance and miniaturization of the sealing device and the apparatus using same. Further, combinations of two silicon carbide sliding members are frequently used where there is a problem in particle wear due to handling of the slurry. Also, in a usage at high PV value, combinations of cemented carbide bodies and bonded carbon bodies, or cemented carbide bodies and cemented carbide bodies and the like are used.

However, when a surface of a silicon carbide sliding member comes into contact with a surface of another silicon carbide sliding member, problems such as abnormal noise (sneaking) and linking easily occur at the startup period. Further, when a surface of a carbon material sliding member comes into contact with a surface of another silicon carbide sliding member, carbon blisters which advance to formation of microcracks and finishes with worm defects sometimes appear on the sliding surface of the carbon material member. Furthermore, when sliding members made of combinations of cemented carbide bodies and another carbon material are used in a freezer and the like, in addition to requiring a high PV value, a large thermal shock is experienced at the startup period because of the repetition of running and stopping, and there are problems such that heat cracks are produced in the sliding surface, and that with carbon material bulges are produced.

In order to respond to such problems, it is disclosed that a sliding member of a seal device is made of a silicon carbide sintered body having pores with suitable ranges of pore diameter and porosity, in which the pores serve liquid reservoirs extruding liquid impregnated therein upon frictional heat at startup to form a liquid film for lubrication (refer to Japanese Patent examined Publication No. H5-69066 (Patent Document 1)).

Also, it is disclosed that a mechanical seal which is, at least at the seal surface and its vicinity, formed of a pre-dispersed material wherein the pores are generally dispersed, and the lubricating characteristics can be improved and the strength is maintained by strictly stipulating the shape and the like of pores (refer to Japanese Patent examined Publication No. H07-88909 (Patent Document 2)).

Patent Document 1: JP Patent examined Publication No. H05-69066

Patent Document 2: JP Patent examined Publication. No. H07-88909

However, in recent years, sliding condition of the mechanical seal becomes more severe, many proposals have been presented to increase the lubricating ability of sliding surface of a sliding member.

SUMMARY

Problems to be Solved by the Invention

As one of causes for interfere with improving lubricating characteristics of sliding members of a mechanical seal, it is considered that the thickness of a fluid lubricating film between sliding surfaces of them is not sufficient for good lubrication. When the thickness of the fluid lubricating film becomes very thin, also, when thin film has some partial fracture portion which provides solid contact action in the sliding surface, consequently, they generate increase of the coefficient of friction or the temperature of the sliding surface.

The present invention is made by considering such problems, and a purpose thereof is to provide a mechanical seal sliding member in which, by achieving satisfactory inflow and maintaining of object fluid in a space between sliding surfaces, it is available to obtain the stable and excellent lubricating characteristics, namely, it is available to improve the lubricating characteristics such as lowering and stabilizing the coefficient of friction and the temperature of sliding surfaces without excessive leakage.

Further, another purpose of the present invention is to provide a mechanical seal comprising such mechanical seal sliding member, and having the stable and excellent lubricating characteristics and sealing efficiency.

Means for Solving the Problems

In order to solve the problems, inventors of the present application have found that when irradiating a linearly polarized femtosecond laser with irradiating energy adjacent to a process threshold level to a material surface, a fine periodic structure with a cycle interval comparable with a laser wavelength and with a ridge depth half or less than the laser wavelength can be formed by a self-structuring manner, and that such periodic structure can improve the lubricating characteristics for lubrication. And as a result of further consideration, it is elucidated that when a sliding member in which a periodic structure is formed on a sliding surface by irradiating a femtosecond laser is applied to a mechanical seal, it is available to improve the lubricating characteristics such as lowering and stabilizing the coefficient of frictions and a temperature of sliding surfaces without excessive leakage, so that the present invention is achieved.

A mechanical seal sliding member of the present invention is a mechanical seal sliding member used as a stationary sliding member or a rotary sliding member in a mechanical seal configured to seal object fluid existing at one side of a radial direction of sliding surfaces slidingly rotating relative to the respective sliding surfaces of the stationary sliding member and the rotary sliding member, and is characterized in that a plurality of grating sections are formed separately in each of which a plurality of linear shape ridge portions parallel to each other are formed in a predetermined region with a predetermined pitch, and the linear shape ridge portions of the plurality of grating sections are formed as inclined at a predetermined angle to a sliding direction of the sliding surfaces.

Note that, it is difficult to form such grating shape periodic structure in which a plurality of linear shape ridge portions are formed in parallel each other with a predetermined pitch, by a conventional method other than the femtosecond laser, namely by a conventional process including lapping process. Therefore, the mechanical seal sliding member having such constitution never existed in the past.

In such a mechanical seal sliding member, due to the structure formed as the grating sections, namely, due to the grating shape periodic structure in which a plurality of linear shape ridge portions are formed in parallel each other with a predetermined pitch, it is available to lead and maintain the object fluid between sliding surfaces. Therefore, it is available to improve the lubricating characteristics without excessive leakage.

Preferably, the mechanical seal sliding member of the present invention is characterized in that the plurality of grating sections are formed along the sliding direction of the sliding surface, and the linear shape ridge portions in the grating sections adjacent to each other are formed as substantially symmetrically to the sliding direction of the sliding surface.

In such a mechanical seal sliding member, due to forming the periodic structure of the grating sections so as to have two kinds of direction characteristics which are symmetrical to the sliding direction, it is available to improve the lubricating characteristics without excessive leakage not only for a rotation in one direction but for rotations in both directions.

Also preferably, the mechanical seal sliding member of the present invention is characterized in that the linear shape ridge portions of the grating sections are formed as inclined at an angle of 10° to 80°, more preferably at an angle of 15° to 45°, to the sliding direction of the sliding surface.

In such a mechanical seal sliding member, the grating sections in which it is available to appropriately lead and maintain the object fluid between the sliding surfaces, can be formed.

Also preferably, the mechanical seal sliding member of the present invention is characterized in that the plurality of grating sections comprise first grating sections and second grating sections in which the directions of the linear shape ridge portions are symmetric to the sliding direction, the direction of the linear shape ridge portions of the first grating sections is inclined at an angle of +10° to +80°, more preferably at an angle of +15° to 45°, to the sliding direction, and the direction of the linear shape ridge portions of the second grating sections is inclined at an angle of −10° to −80°, more preferably at an angle of −15° to −45°, to the sliding direction.

In such a mechanical seal sliding member, the grating sections available to lead and maintain the object fluid between the sliding surfaces for the rotations of the sliding surface in both directions, can be formed.

Also preferably, the mechanical seal sliding member of the present invention is characterized in that land sections are provided between adjacent grating sections along the sliding direction.

In the mechanical seal sliding member of the present invention, it is also preferable to provide grating shape periodic structure consisting of a plurality of ridges extending in a direction perpendicular to the sliding direction on the surfaces of the land sections.

Also preferably, the mechanical seal sliding member of the present invention is characterized in that the grating sections are formed by a silicon type ceramics.

Also preferably, the mechanical seal sliding member of the present invention is characterized in that a ridge pitch of the grating sections is 10 µm or less.

Also preferably, the mechanical seal sliding member of the present invention is characterized in that a ridge depth of the grating sections is 1 µm or less.

In such a mechanical seal sliding member, a mechanical seal sliding member in which it is further preferably available to lead and maintain the object fluid between the sliding surfaces and improve the lubricating characteristics without excessive leakage, can be provided.

Also preferably, the mechanical seal sliding member of the present invention is characterized in that the grating sections are formed by self-structuring manner by irradiating linearly polarized laser with an irradiation strength adjacent to a process threshold level, and scanning irradiation sections thereof with overlapping.

Concretely, forming of the grating sections (periodic structure) to the mechanical seal sliding member is achieved with following processes by using, for example, a femtosecond laser.

(1) irradiating the linearly polarized laser with energy density adjacent to an ablation threshold to a base member of the sliding surface of the mechanical seal sliding member which is under rotating.

(2) occurring interference between incident light and scattering light or a plasma wave along a surface of the base member.

(3) The grating shape periodic structure with a pitch and a depth as fine as wavelength order being formed in a direction perpendicular to a polarizing direction by a self-structuring manner.

In such a mechanical seal sliding member, it is available to form the grating sections having a plurality of fine linear shape ridge portions easily and accurately.

Also preferably, the mechanical seal of the present invention is a mechanical seal configured to seal object fluid existing at one side of a radial direction of the sliding surfaces that a stationary sliding member and a rotary sliding member are facing each other by rotating the sliding surfaces slidingly and relatively, wherein any one of the mechanical seal sliding member as mentioned above is used as the stationary sliding member or the rotary sliding member.

In such a mechanical seal, due to the structure formed on the sliding surface of any one of the stationary sliding member or the rotary sliding member as the grating sections, it is preferably available to lead and maintain the object fluid between the sliding surfaces. Therefore, the mechanical seal in which the lubricating characteristics are improved without excessive leakage, can be provided.

DETAILED DESCRIPTION

Figure 1:
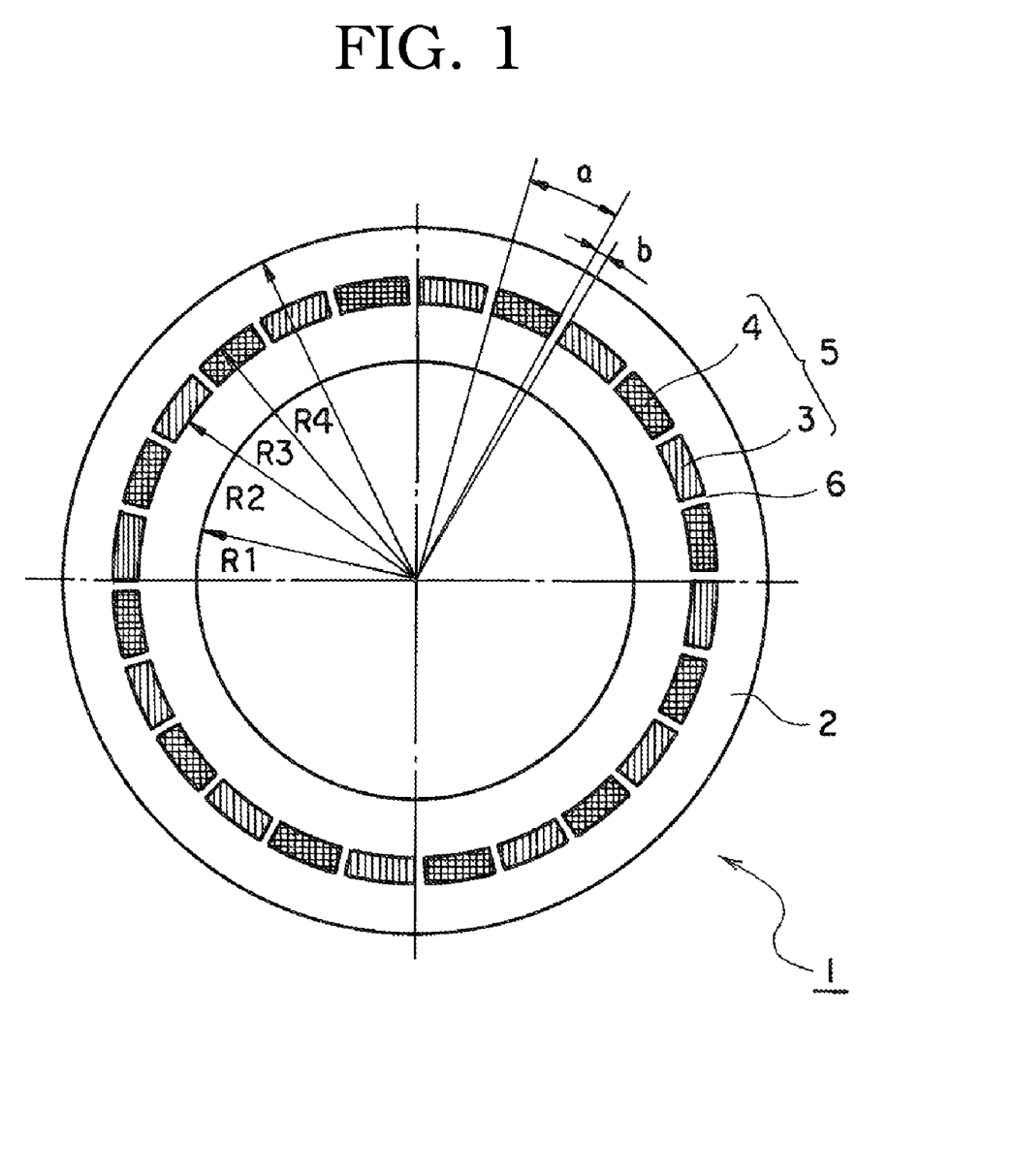
FIG. 1 is a drawing showing a sliding surface of a mechanical seal sliding member of one embodiment of the present invention.
Figure 2:
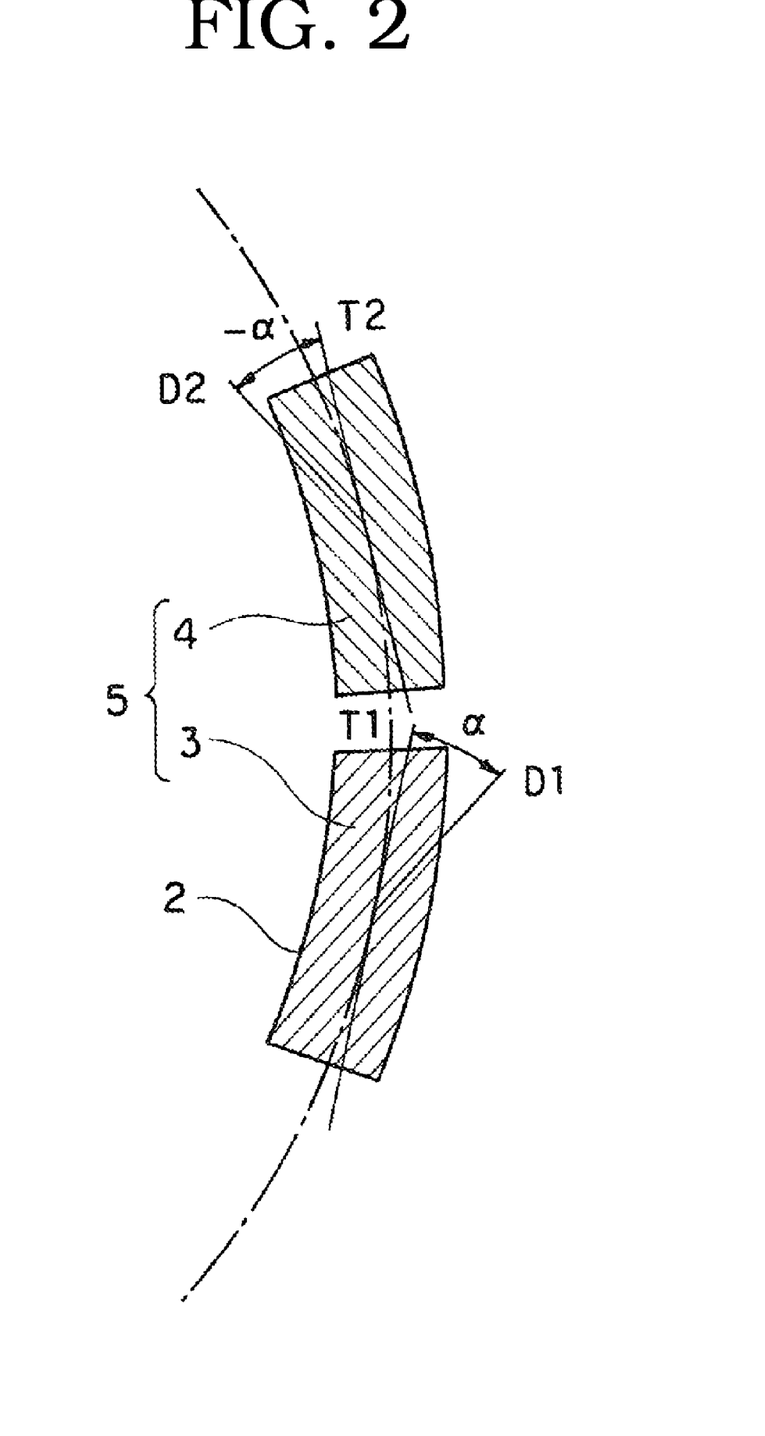
FIG. 2 is a plane view showing structure of ridge portions of grating sections formed on the sliding surface shown in FIG. 1.

With respect to one embodiment of the present invention, it will be specified with reference to FIG. 1 and FIG. 2.

FIG. 1 is a front view showing a sliding surface of a mechanical seal sliding member of the present embodiment.

FIG. 2 is a plane view showing structure of ridge portions of grating sections formed on the sliding surface shown in FIG. 1.

The mechanical seal sliding member 1 having the sliding surface 2 shown in FIG. 1 is a sliding component as one of a stationary ring (stationary sliding member) and a rotary ring (a rotary sliding member) in a mechanical seal for preventing fluid from leaking from a space between a housing and a rotary shaft penetrating thereto, in a pump, a refrigerator or the like.

The mechanical seal sliding member 1 having the sliding surface 2 is provided so that the sliding surface adjacently face to another sliding surface of another sliding member (rotary ring or stationary ring) having the sliding surface which is mirror finished as flat by lapping or the like, in a sealing device equipped between the housing and the rotary shaft. Then, the sliding surface is slidingly rotated relative to another sliding surface according to the rotation of the rotary shaft in the condition that lubricating oil is maintained between the sliding surfaces to seal the object fluid which exists at an outer diameter side or an inner diameter side of the sliding surfaces.

In the present embodiment, as one example, the mechanical seal sliding member 1 is a sliding component used for a mechanical seal as a stationary ring, and the object fluid exists at the outer diameter side thereof.

The sliding surface 2 of the mechanical seal sliding member (stationary ring) 1 is, as shown in FIG. 1, a sliding surface of ring shape having an inner diameter "R1" and an outer diameter "R4", and slidingly rotates relative to a sliding surface of a rotary ring faced thereto along a circumferential direction thereof.

In a region from the radius "R2" to the radius "R3" on the sliding surface 2, a plurality of grating sections 5 are arranged along a circumferential direction. Widths of the respective grating sections 5 are equal to a width of a region in which the grating sections 5 are provided and these are "R3"–"R2".

The respective grating sections 5 is formed with a circumferential length corresponding to a predetermined angle region "a", spaces between the respective grating sections 5 are formed as a land 6 with a circumferential length corresponding to a predetermined angle region "b". Note that, in the present embodiment, "a"=12° and "b"=3°.

Note that, by forming the grating sections 5 within a region from the radius "R2" to the radius "R3", in other words, by forming the grating sections 5 so as not to be arranged in the border section of an atmosphere side (in the present embodiment, an inner diameter side of the mechanical seal sliding member 1) of the sliding section, it becomes possible to reduce leaking quantity of the object fluid to the atmosphere side further.

A plurality of linear shape ridge portions (periodic structure) which are in parallel each other and having a certain pitch, are formed in each grating section 5. This ridge portions are fine structures formed by the femtosecond laser as described below, and a pitch thereof is formed as 10 μm or less, and a depth of the ridges is formed as 1 μm or less.

The linear shape ridge portions (grooves) formed in the grating sections 5 are formed as inclined at a predetermined angle to a sliding direction of the sliding surface 2, in other words, to a rotating tangential direction of the sliding surface 2. The predetermined angle is preferably within a region from 10° to 80° in both side of an inner side and an outer side to the rotating tangential direction of the sliding surface 2.

The inclined angle of the ridge portions to the rotating tangential direction in the respective grating sections 5 may be all same or may be different at each of the grating sections 5. However, because the sliding characteristics of the sliding surfaces are affected by the inclined angle, it is effective to unify the inclined angles of the ridge portions in the respective grating sections 5 to an appropriate specified inclined angle according to required lubricating characteristics, sliding condition and the like in order to obtain the stable sliding characteristics.

Therefore, when the sliding surface 2 rotates in only one direction, the inclined angle of the ridge portions in each of the plurality of grating sections 5 to the rotating tangent is defined at the most appropriate specified angle.

Also, when the sliding surface 2 rotates in both directions of a forward direction and a reverse direction, it is preferable to mix first grating sections 3 and second grating sections 4, wherein the first grating sections 3 have ridge portions inclined to the rotating tangent with a first angle by which appropriate sliding characteristics are obtained at the rotating in the one direction, and wherein the second grating sections 4 have ridge portions inclined to the rotating tangent with a second angle by which appropriate sliding characteristics are obtained at the rotating in the another direction. In such structure, the respective appropriate sliding characteristics can be obtained in the both cases that the sliding surface 2 rotates in the forward direction and in the reverse direction.

More concretely, when the sliding surface 2 rotates in the both directions of the forward direction and the reverse direction, it is preferable to define the inclined angles of the respective ridge portions in the first grating sections 3 and the second grating sections 4 as angles symmetrical toward the rotating tangent.

Also, it is preferable to form the first grating sections 3 and the second grating sections 4 as arranged alternately along the circumferential direction of the sliding surface 2.

The sliding surface 2 shown in FIGS. 1 and 2 has the structure preferable in such case where the sliding surface 2 rotates in the both directions.

Namely, as shown in FIG. 1, the first grating sections 3 and the second grating sections 4 are alternately arranged on the sliding surface 2 along the circumferential direction.

Also, as shown in FIG. 2, the ridge portions of the first grating sections 3 are formed in a direction of "D1" with an angle α to the rotating tangent of the sliding surface 2 shown by a dashed-dotted line in the figure, and the ridge portions of the second grating sections 4 are formed in a direction of "D2" with an angle −α to the rotating tangent of the sliding surface 2 shown by a dashed-dotted line in the figure. Namely, in the first grating sections 3 and the second grating sections 4, the inclining angles of the rigid portions thereof are formed symmetrically to the rotating tangent.

Note that, areas on the sliding surface except for the grating sections 5 are mirror finished surface by an ordinal lapping process.

Here, it is very difficult to form the grating sections 5 having the structure in which a plurality of fine linear shape ridge portions parallel to each other is arranged accurately with a predetermined pitch into grating shape (periodic structure) into predetermined regions arranged strictly on the sliding surface 2 in the condition that directions of the ridge portions in the respective predetermined regions are accurately controlled by using a conventional method including the lapping process.

However, in the present embodiment, the grating sections 5 (3, 4) having the above mentioned structure are formed by using a femtosecond laser.

Namely, when a linearly polarized laser with an irradiation strength adjacent to a process threshold level is irradiated to a base plate, grating shape periodic structure with a pitch and a depth as fine as wavelength order is formed in a direction perpendicular to a polarizing direction by a self-structuring manner by interference between incident light and scattering light or a plasma wave along a surface of the base plate. At this time, by scanning the base plate with overlapping of the femtosecond laser, the pattern of its periodic structure can be formed on a surface.

In the periodic structure using such femtosecond laser, it is possible to control direction characteristics thereof and is possible to control a processing position, a desirable periodic structure can be formed in each of discrete small regions. Namely, by using this method with rotating a sliding surface of a mechanical seal sliding member having a ring shape, the fine periodic patterns can be formed selectively on the sliding surface.

Also, in the processing method using the femtosecond laser, it is possible to form a ridge portion (groove) with a submicron order depth which is effective to improve lubricating characteristics and to decrease leakage in the mechanical seal.

EMBODIMENTS

Below, a concrete example of a mechanical seal sliding member as an embodiment of the present invention and measuring results of the characteristics such as the coefficient of friction and the like of the mechanical seal sliding member, are described.

Initially, a testing machine used for measuring the characteristics of the mechanical seal sliding member is specified.

Figure 3:
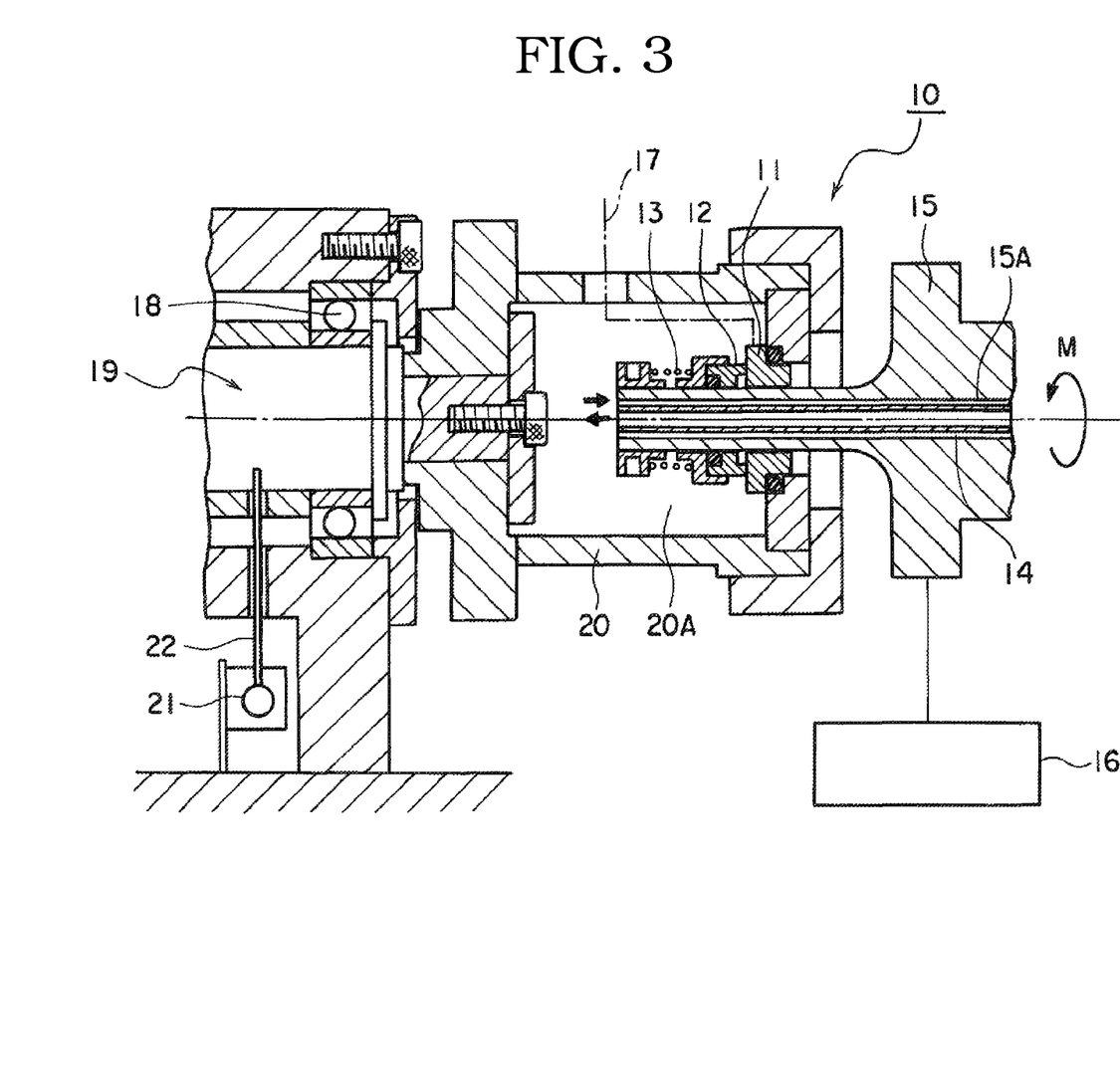
FIG. 3 is a cross section view of a testing apparatus for conducting a test such as measurement and the like as to characteristics of the mechanical seal sliding member of the present invention.

FIG. 3 is a cross sectional view of a mechanical seal type testing machine used for a test of the mechanical seal sliding member according to the present invention.

As shown in FIG. 3, a cylindrical housing 20 is provided at a center portion in a testing machine 10 for a sliding member. A stationary sliding member 11 is mounted by engaging with tightly sealing contact via an O-ring 11 to a mounting surface provided at an object fluid chamber 20A of the housing 20. Also, a rotary sliding member 12 is retained by a retaining device 13 provided around a rotary shaft 15, in which the rotary sliding member 12 is hold elastically by spring and is movable in an axial direction.

Thereby, a seal surface of the rotary sliding member 12 closely contact with an opposite seal surface of the stationary sliding member 11 to seal the object fluid in the object fluid chamber so as not to leak the object fluid toward outside. An outer circumferential side of the stationary member 11 and the rotary sliding member contacts with the object fluid, and an inner circumferential side thereof contacts with an atmosphere.

The rotary shaft 15 is rotated by a motor 16. A rotation number is controlled by an inverter not shown in drawings. Note that, the motor can rotates in both directions.

A passage 15A is provided at a shaft core of the rotary shaft 15, and a pipe 14 is pierced the passage 15A to be arranged therein. Sealed-fluid, for example oil and the like is led through the pipe 14 to flow into the object fluid chamber 20A, and flow out through the passage 15A. Each end of the passage 15A and the pipe 14 is connected to an oil circulation unit not shown in drawings, and it is constituted that the object fluid controlled in a predetermined pressure and a predetermined temperature circulates between the object fluid chamber 20A and the oil circulation unit by a pump apparatus connected with the pipe.

The housing 20 which retains the stationary sliding member 11 is fixed on a shaft 19 which is rotatably supported by a bearing 18. And, it is constituted that the housing 20 is rotated by a friction force (sliding resistance) between the stationary sliding member 11 and the rotary sliding member 12 at the time of rotation of the rotary shaft 15.

The present testing machine is an inside-flow and unbalance type, and the sliding surface is pressed by a pressure of the object fluid and an elastic force of the spring. When a pressure of the object fluid is 0 (zero), the sliding surface is pressed only by the spring of the retaining device 13, and the pressing pressure to the sliding surface is increased with increase of the pressure of the object fluid.

By using the testing machine 10 having such constitution, the characteristics of the mechanical seal sliding member as a embodiment of the present invention and the characteristics of the mechanical seal sliding member as a comparative example are measured.

Measuring items are sliding torque, temperature adjacent to the sliding surface, and object fluid temperature, and leaking quantity from the sliding surface is measured after the test, and further, the coefficient of friction is calculated.

A load cell 21 is provided on a supporting stage which supports the shaft 19, it is constituted to detect a sliding torque "M" via a cantilever 22, and the sliding torque "M" is detected thereby.

The temperature adjacent to the sliding surface is measured by inserting a thermocouple connected with a thermoelectric thermometer into a hole with 2 mm radius provided at a position just below 1 mm from the sliding surface of the stationary sliding member and adhesively fixing it. As for the thermocouple, platinum rhodium-platinum thermocouple, or chromel-alumel thermocouple is used.

The object fluid temperature is measured by inserting a thermocouple (JIS-TYPE-K) not shown in drawings into the object fluid.

The leaking quantity is obtained by transfusing the leaked object fluid with a filter paper whose weight is pre-measured, measuring its weight again, and getting a difference of the weight as the leaking quantity.

Then the coefficient of the friction "f" is calculated using the following formula (1) based on the sliding torque "M".

$$f = M/(W \times r_m) \quad (1)$$

where, W=load, $r_m$=sliding surface average radius.

Condition to manufacture the mechanical seal sliding members as a embodiment of the present invention and as a comparative example, and condition to measure the characteristics thereof are as follows.

1. Femtosecond Laser Testing Piece Processing Condition
(1) Angle of periodic structure: ±45°
(2) Laser: titanium sapphire laser (pulse width 120 fs, central wavelength 800 nm, repeating frequency 1 kHz)

2. Experimentation Condition (1) Sliding member:
Rotary sliding member: silicon carbide material (φ25×φ44×t12)
Stationary sliding member: silicon carbide material (φ28×φ50×t14)
Sliding section shape (φ32×φ40) (2) Surface roughness: Ra 0.02 μm or less
(mirror finish surface roughness prior to femtosecond laser irradiation) Ra 0.05 to 0.10 μm
(surface roughness after lapping process)
(3) Flatness: 1 band (helium right) or less
(4) Object fluid: super multi oil 10 made by Idemitsu Kosan
(5) Testing time: 0.5 (h)
(6) Object fluid temperature: 30(° C.)
(7) Object fluid pressure: 0, 0.07, 0.15, 0.3 (MPa)
(8) Circumferential speed: 1, 2, 5(m/s)
(9) Spring load: 20(N)

Concrete structures of examples 1, 2 and a comparative example in the present embodiment are as follows.

1. Example 1

As an example 1, a mechanical seal sliding member having mirror finished sliding surface was used for a stationary sliding member, and a mechanical seal sliding member having sliding surface wherein a plurality of grating sections (periodic structure) consisting of a plurality of linear shape ridge portions were formed in a plurality of divided sections by femtosecond laser after mirror finish, was used for a rotary sliding member.

The plurality of gratings of the stationary sliding member were provided along a circumferential direction so as to be separated from each other but so as not to arranged on the inner diameter of the sliding surface. Concretely, the grating sections were formed so that a region in a radius direction was from φ37.5 to φ41.5, an angle region in the circumferential direction of each of the grating sections was 12°, and an angle region in the circumferential direction of each of non-processed sections which were spaces between the grating sections was 3°.

Also, a direction of the linear shape ridge portions of the grating sections was formed as inclined with an angle of +45° to a rotary direction (to a rotating tangential direction).

Figure 4:
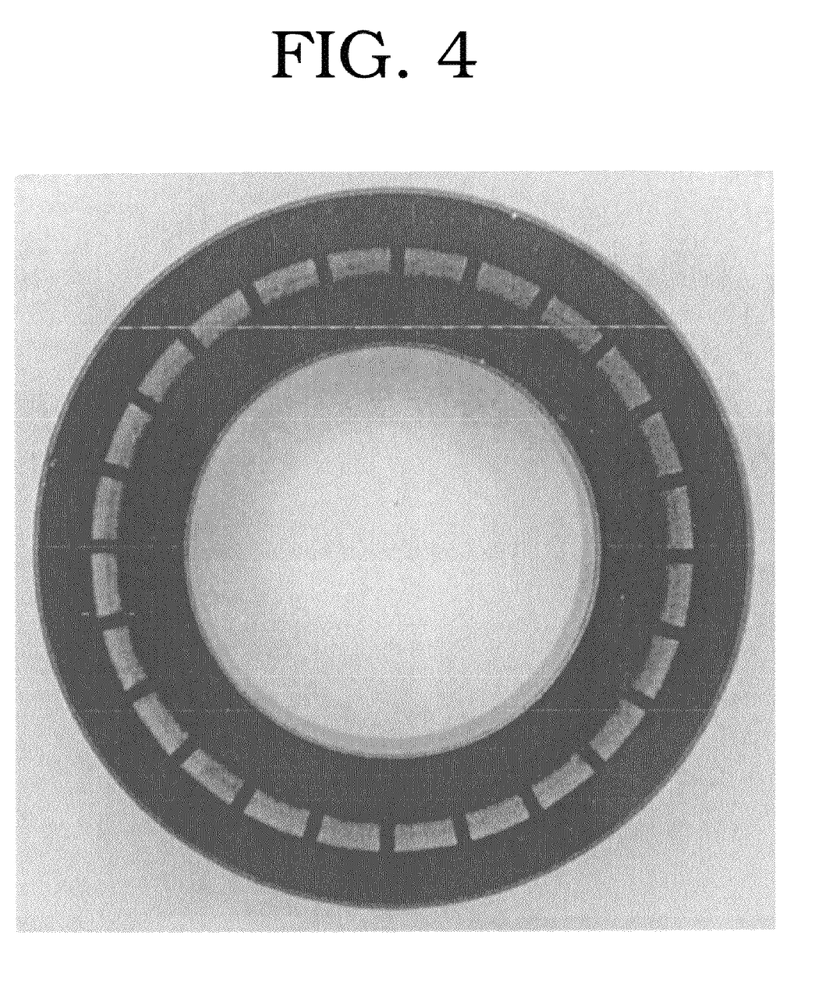
FIG. 4 is a photo picture of a sample of a sliding surface of a stationary sliding member of the embodiment 1 of the mechanical seal sliding member of the present invention.
Figure 5:
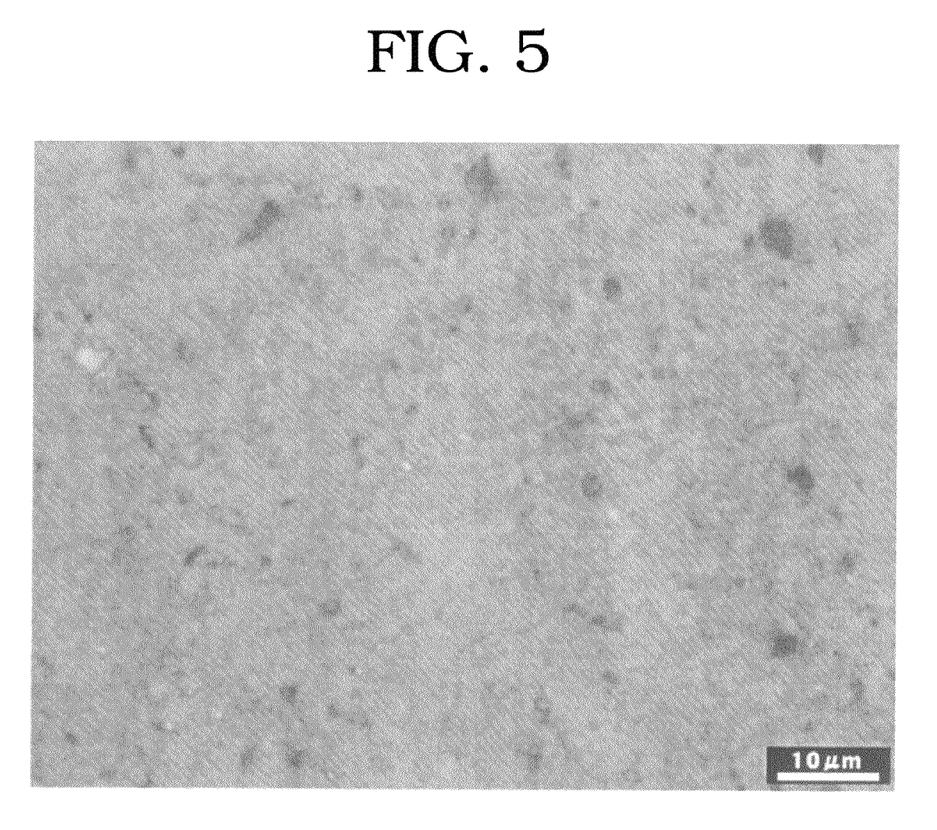
FIG. 5 is a microscope photo picture of the grating section of the sliding surface shown in FIG. 4.

A photo picture of a sample of the sliding surface of the stationary sliding member of the example 1 in the condition mentioned above is shown in FIG. 4, and a micro scope photo picture of the grating section is shown in FIG. 5.

As shown in FIG. 5, it can be recognized that a large number of fine grooves are formed on the surface of the grating section. Note that, in this example, an interval of ridges of grooves (ridge portions) was about 0.7 μm, and an amplitude (depth of the ridges) was about 0.15 μm.

2. Example 2

As an example 2, as similar with the example 1, a mechanical seal sliding member having mirror finished sliding surface was used for a stationary sliding member, and a mechanical seal sliding member having sliding surface wherein a plurality of grating sections (periodic structure) consisting of a plurality of linear shape ridge portions were formed in a plurality of divided sections by femtosecond laser after mirror finish, was used for a rotary sliding member, Also, as similar with the example 1, the plurality of gratings of the stationary sliding member were provided along a circumferential direction so as to be separated from each other but so as not to arranged on the inner diameter of the sliding surface. Concretely, the grating sections were formed so that a region in a radius direction was from φ37.5 to φ41.5, an angle region in the circumferential direction of each of the grating sections was 12°, and an angle region in the circumferential direction of each of non-processed sections which were spaces between the grating sections was 3°.

In the example 2, a direction of the linear shape ridge portions of the grating sections is different from the example 1. In the example 2, the grating sections were formed so that the grating sections wherein the ridge portions were formed as inclined to the rotation direction (to the rotating tangential direction) with +45° and the grating sections wherein the ridge portions were formed as inclined to the rotation direction (to the rotating tangential direction) with −45° were adjacent, in other words, those two kinds of grating sections were formed so as to be arranged alternately along the circumferential direction.

Figure 6:
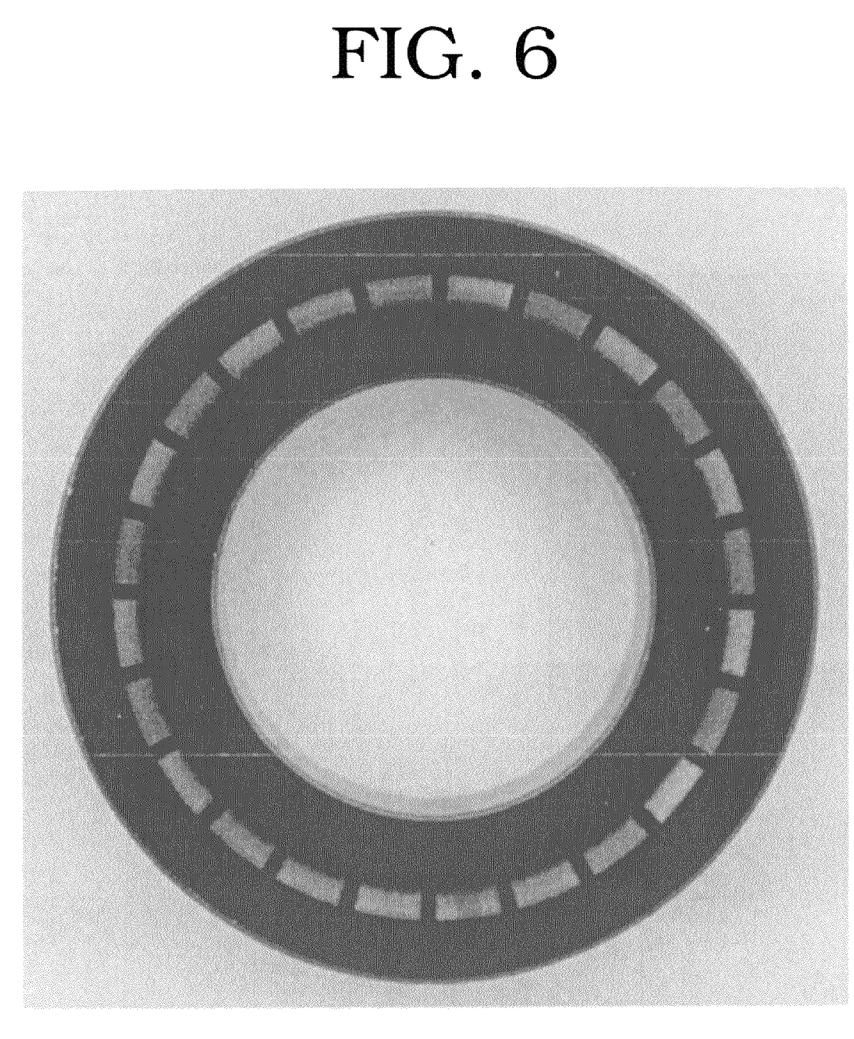
FIG. 6 is a photo picture of a sample of a sliding surface of a stationary sliding member of the embodiment 2 of the mechanical seal sliding member of the present invention.
Figure 7A:
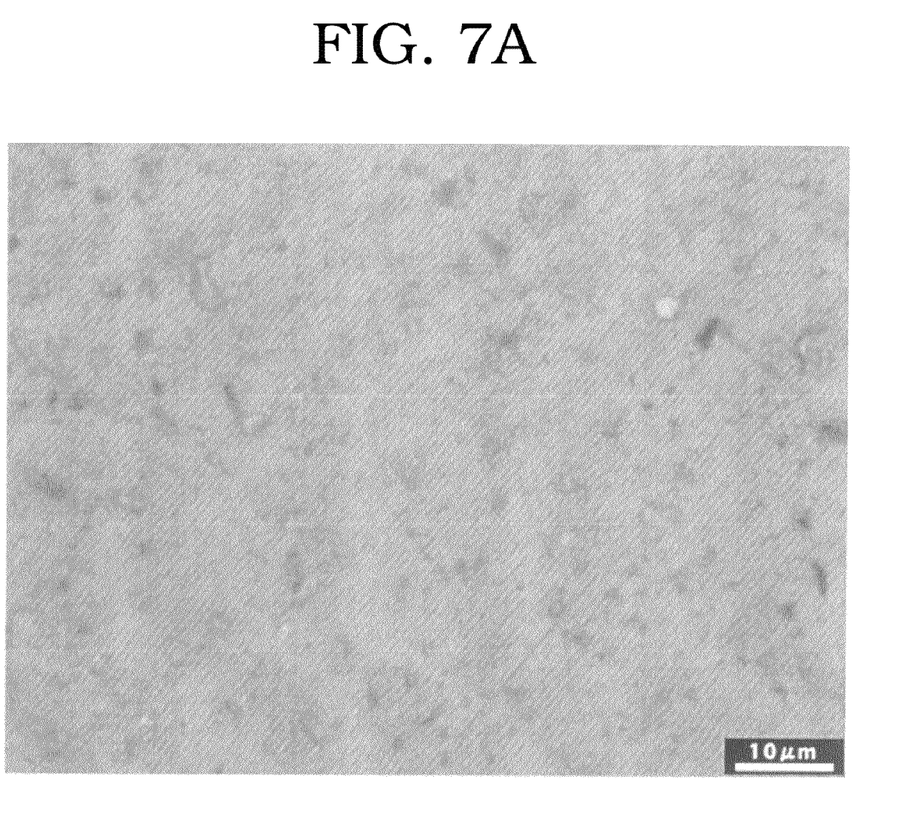
FIG. 7A is a microscope photo picture of the grating section of the sliding surface shown in FIG. 6.
Figure 7B:
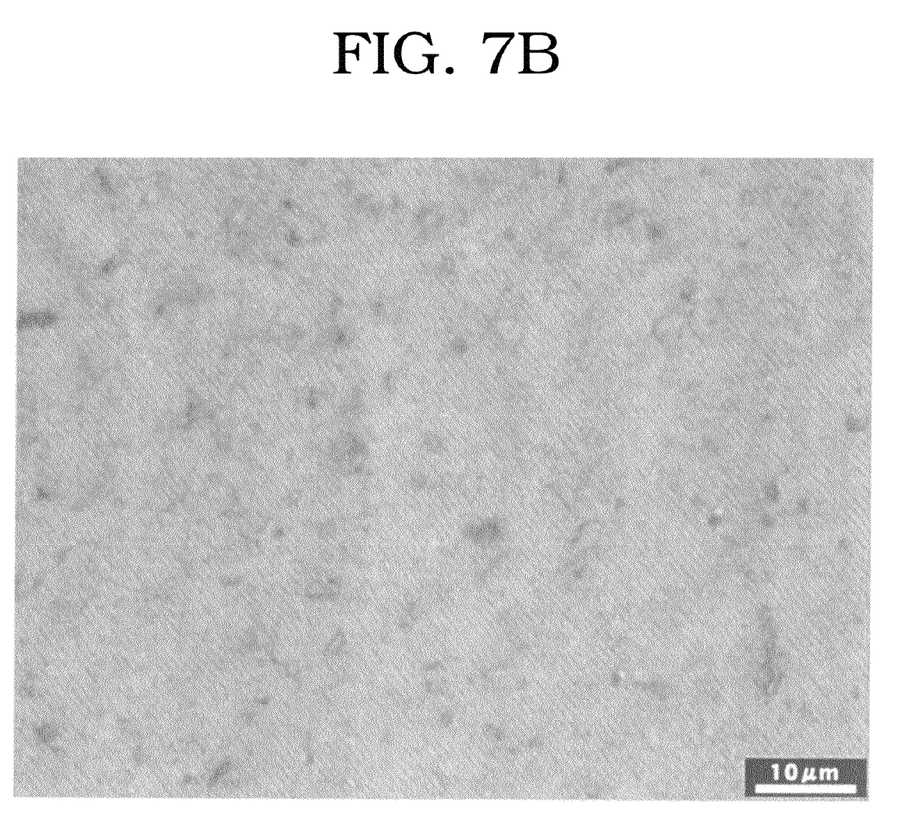
FIG. 7B is, as same as FIG. 7A, a microscope photo picture of the grating section of the sliding surface shown in FIG. 6.

A photo picture of a sample of the sliding surface of the stationary sliding member of the example 2 is shown in FIG. 6, and micro scope photo pictures of the grating sections are shown in FIGS. 7A and 7B.

As shown in FIG. 6, in the sliding surface of the mechanical seal sliding member shown as the example 2, it is recognized that exterior appearances of grating sections are alternately different, and fine ridge portions formed in the grating sections are alternately different.

Also, FIG. 7A and FIG. 7B are micro scope photo pictures of grating sections wherein directions of the ridge portions are +45° and −45° to a rotating direction and the directions of the ridge portions are actually different.

Note that, in examples shown in FIG. 7A and FIG. 7B, an interval of ridges of grooves (ridge portions) was concurrently about 0.7 μm, and an amplitude (depth of the ridge) was concurrently about 0.15 μm.

3. Comparative Example

As a comparative example, sliding members whose sliding surfaces are finished at a lapping process are used for both of a rotary sliding member and a stationary sliding member.

And detecting results of the coefficients of friction to the examples 1, 2 and the comparative example are shown in Table 1 to Table 5.

Table 1 is a table showing the coefficients of friction every object fluid pressure and a rotation circumferential speed under the condition of the example 1, Table 2 is a table showing the coefficients of friction every object fluid pressure and a rotation circumferential speed under the condition of the example 2, and Table 3 is a table showing the coefficients of frictions every object fluid pressure and a rotation circumferential speed under the condition of the comparative example.

Also, Table 4 is a table showing a ratio of the coefficients of friction between the example 1 and the comparative example at every object fluid pressure and a rotation circumferential, and Table 5 is a table showing a ratio of the coefficients of friction between the example 2 and the comparative example at every object fluid pressure and a rotation circumferential.

TABLE 1

Coefficients of friction of Example 1

|  | 1 m/s | 2 m/s | 5 m/s |
| --- | --- | --- | --- |
| 0 MPa | 0.296880584 | 0.3997341 | 0.557657886 |
| 0.07 MPa | 0.075520552 | 0.123382103 | 0.210011496 |
| 0.15 MPa | 0.05088165 | 0.080177864 | 0.132646391 |
| 0.3 MPa | 0.0403412 | 0.056711934 | 0.088689303 |

TABLE 2

Coefficients of friction of Example 2

|  | 1 m/s | 2 m/s | 5 m/s |
| --- | --- | --- | --- |
| 0 MPa | 0.588455946 | 0.737316133 | 0.932963051 |
| 0.07 MPa | 0.104511652 | 0.197506511 | 0.3979867 |
| 0.15 MPa | 0.075763427 | 0.131627638 | 0.234534558 |
| 0.3 MPa | 0.062155729 | 0.092737681 | 0.154623356 |

TABLE 3

Coefficients of friction of Comparative example

|  | 1 m/s | 2 m/s | 5 m/s |
| --- | --- | --- | --- |
| 0 MPa | 1.076725282 | 1.228880813 | 1.408492604 |
| 0.07 MPa | 0.304849259 | 0.45027317 | 0.567951601 |
| 0.15 MPa | 0.206536837 | 0.283751248 | 0.346111807 |
| 0.3 MPa | 0.170388724 | 0.180905042 | 0.197184614 |

TABLE 4

Comparison of coefficients of friction of Example 1/Comparative example

|  | 1 m/s | 2 m/s | 5 m/s |
| --- | --- | --- | --- |
| 0 MPa | 0.27572547 | 0.325283051 | 0.39592532 |
| 0.07 MPa | 0.247730805 | 0.27401611 | 0.369770058 |
| 0.15 MPa | 0.246356293 | 0.282563918 | 0.383247228 |
| 0.3 MPa | 0.2367598 | 0.313490068 | 0.449778009 |

TABLE 5

Comparison of coefficients of friction of Example 1/Comparative example

|  | 1 m/s | 2 m/s | 5 m/s |
| --- | --- | --- | --- |
| 0 MPa | 0.546523757 | 0.599989947 | 0.662384061 |
| 0.07 MPa | 0.34283059 | 0.438637087 | 0.700740519 |
| 0.15 MPa | 0.366827673 | 0.463883907 | 0.677626573 |
| 0.3 MPa | 0.364787804 | 0.512631822 | 0.784155277 |

As shown in Table 4 and Table 5, in a region of the condition of the present examples, when the coefficient of friction of the comparative example was 1, the coefficient of friction of the example 1 was in a region from 0.23 to 0.45, and the coefficient of friction of the example 2 was in a region from 0.34 to 0.79, so that, in any cases, it was recognized that the coefficients of friction could be decreased by forming grating sections on the sliding surfaces. Also, the particular lower coefficient of friction can be obtained at a lower speed wherein the lubrication condition tends to deteriorate.

Note that, although these results were results in the case of right rotation of the rotary seal ring, the same results were confirmed in the case of reverse rotation of the rotary seal ring for the comparative example and the example 2.

Also, although leaking quantity is not shown in the drawings, all of them are slight quantity of 0.5 cc/h or less in a region of the present condition.

As mentioned above, in the mechanical seal sliding member of the present invention, since a plurality of fine linear shape ridge portions (grating sections) are formed on the sliding surfaces, when it is structured as a mechanical seal, it is preferably available to lead and maintain the object fluid between the sliding surfaces, so that the stable and excellent lubricating characteristics can be obtained. Namely, according to the present invention, it can be provided a mechanical seal sliding member in which it is available to improve the lubricating characteristics such as lowering and stabilizing the coefficient of friction and the temperature of sliding surfaces without excessive leakage.

Also, since the grating sections are formed by irradiating a linearly polarized femtosecond laser with irradiating energy adjacent to a process threshold level to a material surface, a large number of fine linear shape ridge portions can be formed on the surface of the sliding surface easily, in the predetermined condition, and with the constant pitch.

Note that, the above mentioned embodiments are described for easily understanding of the present invention and do not limit the present invention at all. Respective elements disclosed in the present embodiments include all design around and equivalents included in a technical scope of the present invention, also various arbitral modifications are available.

For example, a shape and a location of the grating sections formed on the sliding surface, a number, a pitch, a form and the like of ridge portions formed as grating sections are not limited to the above mentioned examples, but they may be formed arbitrarily.

Also, the present invention is characterized by forming the grating sections on the sliding surface of the mechanical seal sliding member, and material itself of the mechanical seal sidling member is not limited at all.

Also, in the above mentioned examples, although a method using a femtosecond laser to form the grating sections on the sliding surface of the mechanical seal sliding member is described, this is a preferable one example and not limited thereto. Any arbitral method can be used, if similar fine ridge portion can be made by the method.

INDUSTRIAL APPLICABILITY

A mechanical seal sliding member and a mechanical seal device of the present invention are effective by applying a shaft seal device for a pump, a refrigerator, and the like, and other arbitral seal devices.

The invention claimed is:

1. A mechanical seal sliding member used as a stationary sliding member or a rotary sliding member in a mechanical seal configured to seal object fluid existing at one side of a radial direction of sliding surfaces slidingly rotating relative to the respective sliding surfaces of the stationary sliding member and the rotary sliding member, wherein,
    a plurality of grating sections are formed separately along a circumferential direction, each of said grating sections consists of a periodic structure that a plurality of linear shape ridge portions parallel to each other are formed in a predetermined region with a predetermined pitch,
    said linear shape ridge portions of said plurality of grating sections are formed as inclined at a predetermined angle to a sliding direction of said sliding surfaces, said linear ridge portions have a depth of about half of a laser wavelength or less, and said grating sections are formed so as not to be arranged in a border section of an atmosphere side of a sliding section of said stationary sliding member and the rotary sliding member.

2. The mechanical seal sliding member as set forth in claim 1, wherein
said plurality of grating sections are formed along the sliding direction of said sliding surface, and
said linear shape ridge portions in said grating sections adjacent to each other are formed as substantially symmetrically to said sliding direction of said sliding surface.

3. The mechanical seal sliding member as set forth in claim 2, wherein
said plurality of grating sections comprise first grating sections and second grating sections in which the directions of said linear shape ridge portions are symmetric to said sliding direction, the direction of said linear shape ridge portions of said first grating sections is inclined at an angle of +10° to +80° to said sliding direction, and the direction of said linear shape ridge portions of said second grating sections is inclined at an angle of −10° to −80° to said sliding direction.

4. The mechanical seal sliding member as set forth in claim 1, wherein
said linear shape ridge portions of said grating sections are formed as inclined at an angle of 10° to 80° to the sliding direction of said sliding surface.

5. The mechanical seal sliding member as set forth in claim 1, wherein
land sections are provided between adjacent grating sections along said sliding direction.

6. The mechanical seal sliding member as set forth in claim 1, wherein
said grating sections are formed by a silicon ceramic.

7. The mechanical seal sliding member as set forth in claim 1,
wherein a ridge pitch of said grating sections is 10 μm or less.

8. The mechanical seal sliding member as set forth in claim 1,
wherein a ridge depth of said grating sections is 1 μm or less.

9. The mechanical seal sliding member as set forth in claim 1,
wherein said grating sections are formed by a self-structuring manner by irradiating linearly polarized laser with an irradiation strength adjacent to a process threshold level, and scanning irradiation region thereof with overlapping.

10. A mechanical seal configured to seal object fluid existing at one side of a radial direction of sliding surfaces that a stationary sliding member and a rotary sliding member are facing each other by rotating the sliding surfaces slidingly and relatively, wherein said mechanical seal sliding member as set forth in claim 1 is used as said stationary sliding member or said rotary sliding member.

\* \* \* \* \*